(12) United States Patent
Yun

(10) Patent No.: US 11,525,293 B2
(45) Date of Patent: Dec. 13, 2022

(54) DEVICE FOR OPERATING OPPOSITE SLIDING DOORS

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 582 days.

(21) Appl. No.: 16/590,998

(22) Filed: Oct. 2, 2019

(65) Prior Publication Data

US 2020/0190880 A1    Jun. 18, 2020

(30) Foreign Application Priority Data

Dec. 12, 2018 (KR) ........................ 10-2018-0159594

(51) Int. Cl.
  *E05D 15/10* (2006.01)
  *B60J 5/04* (2006.01)
  *B60J 5/06* (2006.01)
  *E05D 15/06* (2006.01)

(52) U.S. Cl.
  CPC .......... *E05D 15/101* (2013.01); *B60J 5/0477* (2013.01); *B60J 5/06* (2013.01); *E05D 15/0621* (2013.01); *E05D 2015/1026* (2013.01); *E05Y 2201/684* (2013.01); *E05Y 2900/531* (2013.01)

(58) Field of Classification Search
  CPC ............. E05D 15/0686; E05D 15/101; E05D 15/1047; B60J 5/0477; B60J 5/0479
  See application file for complete search history.

(56) References Cited

U.S. PATENT DOCUMENTS 4,464,863 A * 8/1984 Chikaraishi ......... E05D 15/1047
                                                49/213
4,559,740 A * 12/1985 Tuchiya .................... B60J 5/06
                                                49/223
5,934,022 A * 8/1999 Faubert ................... E05F 5/003
                                                49/360
5,967,595 A * 10/1999 Heya ......................... B60J 5/06
                                                49/213

(Continued)

FOREIGN PATENT DOCUMENTS

DE    102012112490 A1 * 4/2014 ................ B60J 5/06
DE    102015216286 A1    5/2016

(Continued)

*Primary Examiner* — Marcus Menezes
(74) *Attorney, Agent, or Firm* — Slater Matsil, LLP

(57) ABSTRACT

A device for operating opposite sliding doors of a vehicle includes a center rail mounted at a center inside a door and formed in a curved shape so that the door moves to the outside of a vehicle interior of the vehicle when the door is opened. A center roller is mounted on the vehicle body so as to correspond to the center rail. The center roller is configured to move the center rail by being coupled to the center rail when the door is opened or closed as a center bearing unit formed at one side of the center roller is seated on the center rail. The center roller has a center shaft formed at a position spaced apart from the center bearing unit such that the center shaft can rotate the center roller.

20 Claims, 8 Drawing Sheets

(56) References Cited

U.S. PATENT DOCUMENTS

| | | | | |
|---|---|---|---|---|
| 6,328,374 B1* | 12/2001 | Patel | ............... | E05D 15/1047 49/213 |
| 6,611,990 B1* | 9/2003 | Sogo | ............... | B66C 13/54 296/202 |
| 7,669,367 B2* | 3/2010 | Shimura | ............... | E05D 15/1047 49/213 |
| 7,954,880 B2* | 6/2011 | Kunishima | ............... | E05D 15/1081 296/146.12 |
| 9,475,368 B2* | 10/2016 | Choi | ............... | B60J 5/0479 |
| 9,493,056 B2* | 11/2016 | Choi | ............... | B60J 5/047 |
| 11,332,081 B2* | 5/2022 | Choi | ............... | E05D 15/0686 |
| 2008/0106120 A1* | 5/2008 | Kim | ............... | B60J 5/062 296/190.01 |
| 2009/0072583 A1* | 3/2009 | Elliott | ............... | B60J 5/0479 296/24.3 |
| 2010/0077668 A1* | 4/2010 | Dries | ............... | E05D 15/0652 16/101 |
| 2010/0078961 A1* | 4/2010 | Takaya | ............... | B60J 5/06 296/155 |
| 2011/0025099 A1* | 2/2011 | Pencak | ............... | E05F 5/06 49/404 |
| 2011/0089714 A1* | 4/2011 | Kitayama | ............... | B60J 5/06 16/91 |
| 2015/0167370 A1* | 6/2015 | Choi | ............... | E05D 15/1081 403/83 |
| 2015/0183303 A1 | 7/2015 | Choi et al. | | |
| 2016/0129769 A1* | 5/2016 | Choi | ............... | E05B 85/24 49/159 |
| 2016/0272053 A1* | 9/2016 | Maruyama | ............... | E05B 83/40 |
| 2017/0130504 A1* | 5/2017 | Westgarth | ............... | E05D 13/04 |
| 2020/0181968 A1* | 6/2020 | Suzuki | ............... | E05F 15/646 |
| 2020/0362606 A1* | 11/2020 | Choi | ............... | B60J 5/08 |
| 2021/0079703 A1* | 3/2021 | Yun | ............... | E05D 15/30 |
| 2021/0140215 A1* | 5/2021 | Choi | ............... | E05B 83/38 |
| 2021/0162843 A1* | 6/2021 | Yun | ............... | E05D 15/0665 |
| 2022/0090427 A1* | 3/2022 | Choi | ............... | E05D 15/48 |
| 2022/0106822 A1* | 4/2022 | Yun | ............... | E05D 15/101 |

FOREIGN PATENT DOCUMENTS

| | | | | |
|---|---|---|---|---|
| DE | 102020109652 A1 * | 5/2021 | ............... | B60J 5/047 |
| EP | 0800944 A1 | 10/1997 | | |
| EP | 1566508 A1 * | 8/2005 | ............... | E05D 15/0665 |
| EP | 1916133 A1 * | 4/2008 | ............... | B60J 5/06 |
| EP | 1916133 A1 | 4/2008 | | |
| EP | 3249144 A1 * | 11/2017 | ............... | B60J 5/06 |
| FR | 2739329 A1 * | 4/1997 | ............... | B60J 5/06 |
| FR | 2878553 A1 * | 6/2006 | ............... | E05D 15/1047 |
| GB | 2082660 A * | 3/1982 | ............... | B60J 5/062 |
| GB | 2572145 A * | 9/2019 | ............... | B60J 5/06 |
| JP | 2003097137 A * | 4/2003 | ............... | E05D 15/0652 |
| KR | 101542980 B1 | 8/2015 | | |

* cited by examiner

DEVICE FOR OPERATING OPPOSITE SLIDING DOORS

CROSS-REFERENCE TO RELATED APPLICATIONS

This application claims priority to Korean Patent Application No. 10-2018-0159594, filed in the Korean Intellectual Property Office on Dec. 12, 2018, which application is hereby incorporated herein by reference.

TECHNICAL FIELD

The present invention relates to a device for operating opposite sliding doors.

BACKGROUND

In general, a vehicle has an occupant compartment having a predetermined size so that a driver or an accompanied occupant may be seated therein, and occupant compartment opening/closing doors are installed on a vehicle body to open or close the occupant compartment.

In the case of a passenger vehicle, the occupant compartment opening/closing doors include a front door installed at a front side in a longitudinal direction of the vehicle and a rear door installed at a rear side in the longitudinal direction of the vehicle. The front door and the rear door are typically installed on the vehicle body so as to be rotatable by means of hinges.

Meanwhile, in the case of a van in which many persons may be seated, the occupant compartment opening/closing doors slide forward and rearward in the longitudinal direction of the vehicle to open or close the occupant compartment.

Recently, a necessity of completely opening a door opening to allow a disabled person to be easily seated in the vehicle and make it easy to load articles becomes a serious issue, and as a result, the sliding doors are required to be installed even in a general passenger vehicle as well as a van.

In this regard, Korean Patent No. 10-1542980 in the related art (Rear Door Device for Vehicle) discloses a rear door device that opens or closes a door opening of a vehicle body while moving forward and rearward in a longitudinal direction of a vehicle and opens or closes sliding doors by utilizing an upper rail having a straight shape, a lower rail having a curved shape, and a link structure.

However, in the related art, there is a problem in that a structure of a roller includes multiple links, such that the structure is complicated, slight breakdowns often occur, and product costs are increased.

Because the rear door device includes no configuration for preventing the door from rotating or moving when the door is opened or closed, there is a problem in that stability deteriorates.

SUMMARY

Embodiments of the present invention relate to a device for operating opposite sliding doors that enables the doors to smoothly slide in opposite directions in a longitudinal direction of a vehicle. Particular embodiments relate to a device for operating opposite sliding doors that improves opening/closing characteristics of the doors and simplifies a structure by utilizing a center roller having a rotating shaft, a lower roller having a rotating shaft, a center rail having a curved shape, and a lower rail having a curved shape.

Embodiments of the present invention can provide a device for operating opposite sliding doors, which simplifies a structure by utilizing a center roller having a rotating shaft, a lower roller having a rotating shaft, a center rail having a curved shape, and a lower rail having a curved shape in a device for operating sliding doors in the related art, prevents the door from rotating when the door is opened or closed by utilizing an anti-rotation bearing, and prevents the door in an opened or closed state from moving by utilizing a stopper.

An exemplary embodiment of the present invention provides a device for operating opposite sliding doors. The device includes a center rail which is mounted at a center inside a door in a longitudinal direction of a vehicle body and formed in a curved shape so that the door moves to the outside of a vehicle interior of a vehicle when the door is opened. A center roller is mounted on the vehicle body so as to correspond to the center rail and moves the center rail by being coupled to the center rail when the door is opened or closed as a center bearing unit formed at one side of the center roller is seated on the center rail. A lower rail is mounted at a lower side of the vehicle body in the longitudinal direction of the vehicle body and formed in a curved shape so that the door moves inside the vehicle when the door is closed; and a lower roller which is mounted at a lower side inside the door so as to correspond to the lower rail and moves along the lower rail by being coupled to the lower rail when the door is opened or closed as a lower bearing unit formed at one side of the lower roller is seated on the lower rail. The center roller has a center shaft formed at a position spaced apart from the center bearing unit, and the lower roller has a lower shaft formed at a position spaced apart from the lower bearing unit, such that the center shaft and the lower shaft rotate the center roller and the lower roller, respectively.

The doors may include a front door and a rear door, and the pair of center rails, the pair of center rollers, the pair of lower rails, and the pair of lower rollers are mounted vertically symmetrically, such that the front door and the rear door may be opened in opposite directions.

The center rail may further include a center guide portion which is bent in an n shape toward the center roller and positioned at an upper side of the center rail.

The center rail may further include a center support portion which is formed by bending a lower portion of the center rail toward the center roller.

The center roller may further include: a center fixing unit which has one side which is mounted on the vehicle body to fix the center roller to the vehicle body, and the other side which is bent at a predetermined angle and at which the center shaft is formed; and a center rotation unit which has one end which is connected to the center fixing unit so as to be pivotable about the center shaft, and the other end at which the center bearing unit is mounted.

The center roller may further include a center rotation restriction unit which is connected to the center fixing unit so as to be pivotable about the center shaft and mounted at a lateral side of the center rotation unit to restrict a rotation angle of the center rotation unit when the door is opened or closed.

When the door is opened, the center rotation unit may rotate about the center shaft to enable the center roller to move relative to the curved center rail and simultaneously rotate the door to the outside of the vehicle interior of the vehicle body, and when the door is closed, the center rotation unit may rotate about the center shaft to enable the center roller to move relative to the curved center rail and simultaneously rotate the door to the inside of the vehicle interior of the vehicle body.

The center bearing unit may further include a center guide bearing which is formed in a cylindrical shape and inserted into a lower side of the center guide portion so that a circumferential surface of the center guide bearing comes into contact with a lateral surface of the center guide portion, such that the circumferential surface of the center guide bearing rotates along the lateral surface of the center guide portion to allow the center roller to perform a rolling movement when the door is opened or closed, and the center guide bearing may prevent the center roller from being withdrawn from the center rail and guide the door along a movement trajectory.

The center bearing unit may further include a center anti-rotation bearing which is formed in a cylindrical shape and inserted into an upper side of the center support portion so that a circumferential surface of the center anti-rotation bearing comes into contact with the center support portion, such that the center anti-rotation bearing rotates in a state in which the circumferential surface of the center anti-rotation bearing is in contact with an upper surface of the center support portion when the door is opened or closed, and the center anti-rotation bearing may prevent a rotation of the door caused by a load of the door when the door is opened or closed.

The center bearing unit may further include a center rod bearing which is formed in a cylindrical shape and inserted into a lower side of the center support portion so that a circumferential surface of the center rod bearing comes into contact with the center support portion, such that the center rod bearing rotates in a state in which the circumferential surface of the center rod bearing is in contact with a lower surface of the center support portion when the door is opened or closed, and the center rod bearing may support a load of the door.

The center bearing unit may have a male stopper which is formed in a protrusion shape at an upper side of the center bearing unit to prevent the center rail from moving while exceeding a predetermined range.

The center rail may further include: a full-opening female stopper which is formed at one side thereof so as to come into contact with the male stopper when the door is opened; and a closing female stopper which is formed at the other side thereof so as to come into contact with the male stopper when the door is closed, and the full-opening female stopper, the closing female stopper, and the male stopper may restrict an opening/closing range of the door.

The full-opening female stopper, together with the male stopper, may prevent the movement of the door by fixing the door when the door is in an opened state, and the closing female stopper, together with the male stopper, may prevent the movement of the door by fixing the door when the door is in a closed state.

The lower rail may further include: a lower guide portion which is bent in an n shape toward the lower roller and positioned at an upper side of the lower rail; and a lower support portion which extends from the lower guide to the lower roller.

The lower rail may further include a lower anti-rotation portion which is formed by bending a lower portion of the lower rail toward the lower roller.

The lower roller may further include: a lower fixing unit which has one side which is mounted on the door to fix the lower roller to the door, and the other side which is bent at a predetermined angle and at which the lower shaft is formed; and a lower rotation unit which has one end which is connected to the lower fixing unit so as to be pivotable about the lower shaft, and the other end at which the lower bearing unit is mounted.

When the door is opened, the lower rotation unit may rotate about the lower shaft to enable the lower roller to move along the curved lower rail and simultaneously rotate the door to the outside of the vehicle interior of the vehicle body, and when the door is closed, the lower rotation unit may rotate about the lower shaft to enable the lower roller to move along the curved lower rail and simultaneously rotate the door to the inside of the vehicle interior of the vehicle body.

The lower bearing unit may further include a lower guide bearing which is formed in a cylindrical shape and inserted into a lower side of the lower guide portion so that a circumferential surface of the lower guide bearing comes into contact with a lateral surface of the lower guide portion, such that the lower guide bearing performs a rolling movement along the lower rail when the door is opened or closed, and the lower guide bearing may prevent the lower roller from being withdrawn from the lower rail and guide the door along a movement trajectory.

The lower bearing unit may further include a lower rod bearing which is formed in a cylindrical shape and inserted into a lower side of the lower support portion so that a circumferential surface of the lower rod bearing comes into contact with a lower surface of the lower support portion, such that the lower rod bearing performs a rolling movement along the lower support portion when the door is opened or closed, and the lower rod bearing may support a load of the door.

The lower bearing unit may further include a lower anti-rotation bearing which is positioned such that a circumferential surface of the lower anti-rotation bearing comes into contact with the lower anti-rotation portion and prevents a rotation of the door caused by a load of the door when the door is opened or closed.

The lower anti-rotation bearing may further include: a first lower anti-rotation bearing which is positioned such that a circumferential surface of the first lower anti-rotation bearing comes into contact with an upper surface of the lower anti-rotation portion and performs a rolling movement along the lower anti-rotation portion when the door is opened or closed; and a second lower anti-rotation bearing which is positioned such that a circumferential surface of the second lower anti-rotation bearing comes into contact with a lateral surface of the lower anti-rotation portion and performs a rolling movement along the lower anti-rotation portion when the door is opened or closed.

According to the present invention configured as described above, there is an advantage in that when the door is opened, the curved center rail moves the door to the outside of the vehicle interior, thereby reducing power required to open the door.

According to the present invention, there is an advantage in that the center rail is mounted on the door instead of the vehicle body, such that an internal space may be utilized, and the center rail is not exposed to the outside.

According to the present invention, there is an advantage in that a rail is removed from an upper side of the vehicle body, such that the device may also be utilized for a general passenger vehicle other than a box-shaped vehicle or a van.

According to the present invention, there is an advantage in that a movement structure of the door is simplified by utilizing the curved center rail and the curved lower rail.

According to the present invention, there is an advantage in that the center roller having the rotating shaft and the lower roller having the rotating shaft move the door to the inside or outside of the vehicle interior of the vehicle body without a separate link structure required to open or close the door, the device is easily manufactured, and costs are reduced.

According to the present invention, there is an advantage in that the center roller having the rotating shaft and the lower roller having the rotating shaft may move along the curved center rail and the curved lower rail, such that opening/closing characteristics of the door are improved.

According to the present invention, there is an advantage in that the male stopper is mounted on the center roller and the female stopper is mounted on the center rail, so as to restrict a movement range of the door and prevent a movement of the door, such that stability and accuracy are improved when the door is opened or closed.

According to the present invention, there is an advantage in that the anti-rotation bearings are mounted on the center roller and the lower roller to prevent the rotation of the door caused by a load of the door, such that accuracy of an operation of the door is improved, and durability of components is improved.

DETAILED DESCRIPTION OF ILLUSTRATIVE EMBODIMENTS

Figure 1A:
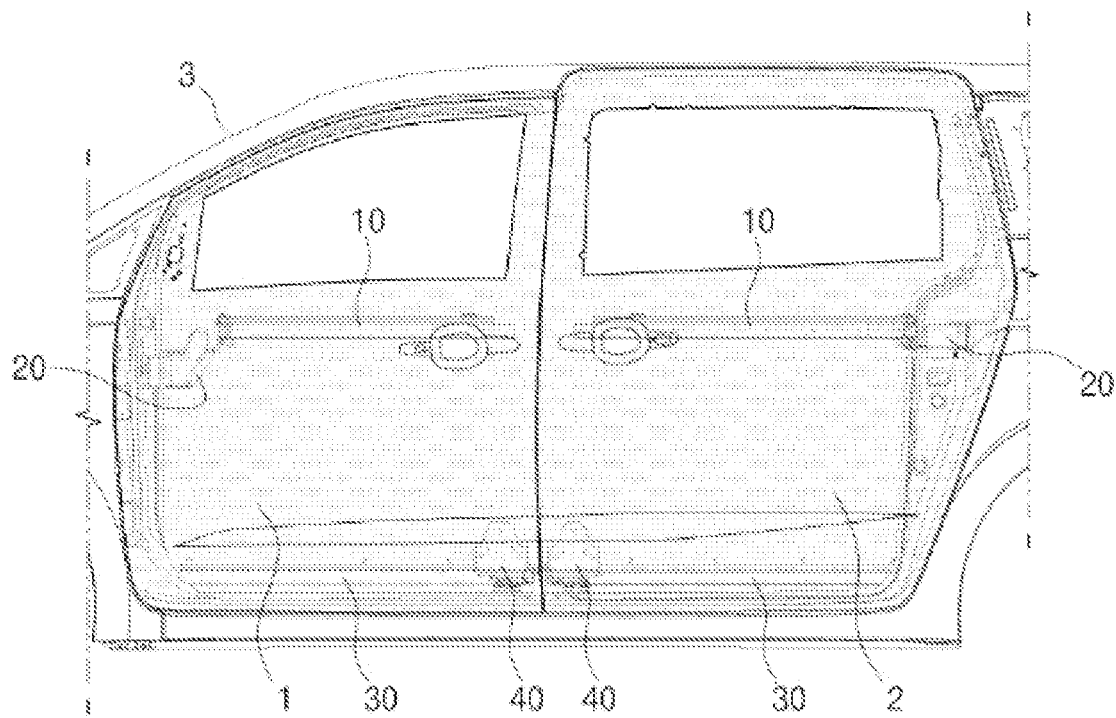
FIG. 1A is a front view of a vehicle on which a device for operating opposite sliding doors according to the present invention is mounted in a state in which the doors are closed.

Hereinafter, the present invention will be described in detail with reference to the accompanying drawings. However, the present invention is not restricted or limited by exemplary embodiments. Like reference numerals indicated in the respective drawings refer to members which perform substantially the same functions.

Figure 1B:
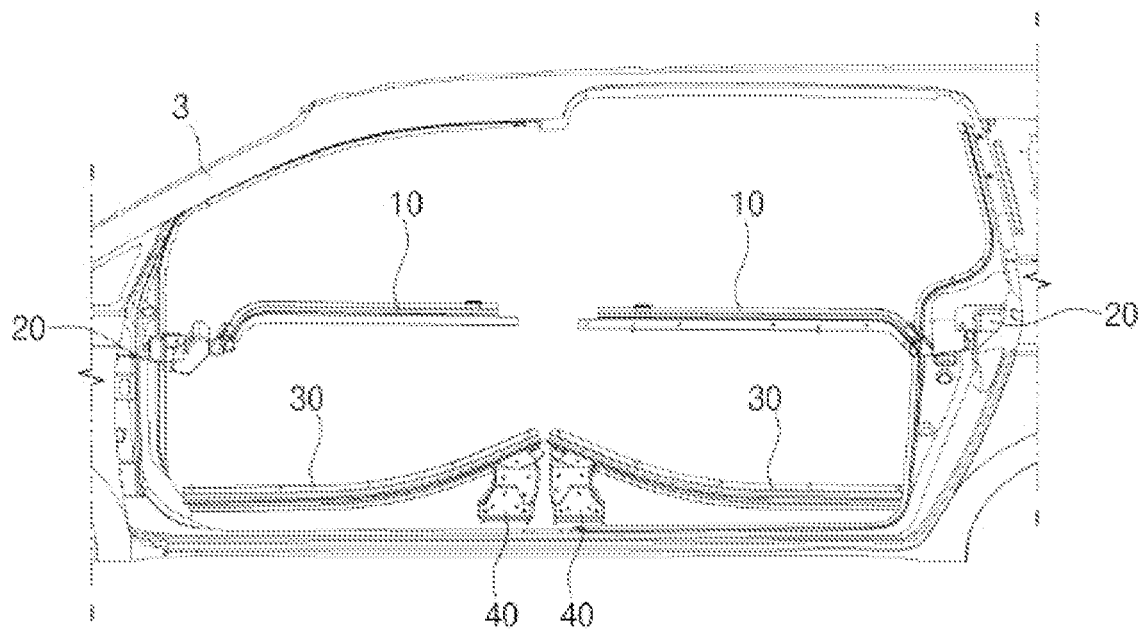
FIG. 1B is a front view illustrating a state in which the doors are removed from the vehicle on which the device for operating opposite sliding doors according to the present invention is mounted when the doors are closed.

FIG. 1A illustrates a front view of a vehicle on which a device for operating opposite sliding doors according to the present invention is mounted in a case in which the doors are closed, and FIG. 1B illustrates a front view illustrating a state in which the doors are removed from the vehicle on which the device for operating opposite sliding doors according to the present invention is mounted when the doors are closed.

Referring to FIGS. 1A and 1B, the device for operating opposite sliding doors according to the present invention may include center rails 10, center rollers 20, lower rails 30, and lower rollers 40.

The doors according to the present invention include a front door 1 and a rear door 2, and the pair of center rails 10, the pair of center rollers 20, the pair of lower rails 30, and the pair of lower rollers 40 are mounted symmetrically, thereby enabling the front door 1 and the rear door 2 to be opened in opposite directions.

As illustrated in FIG. 1A, the center rail 10 may be mounted at a center inside the door in a longitudinal direction of a vehicle body 3.

Since the center rail 10 is mounted inside the door unlike a center rail in the related art, the center rail 10 may not be exposed to the outside even though the door of the vehicle is closed.

In the related art, because the center rail is mounted on the vehicle body 3, there is a problem in that in the case of a front door 1, there is no space for mounting the center rail 10 on the vehicle body 3, such that the front door 1 and the rear door 2 cannot slide in opposite directions.

However, in the present invention, since the center rails 10 are mounted on the doors, not only the rear door 2 but also the front door 1 may be slidably installed, such that the front door 1 and the rear door 2 may be opened in opposite directions.

The center roller 20 is mounted on and fixed to the vehicle body 3 at a corresponding position so as to be coupled to the center rail 10, and a center bearing unit 250 (see FIG. 4), which is formed at one side of the center roller 20, is seated on the center rail 10 when the door is opened or closed, such that the center rail 10 may allow the center roller 20 to move when the door is opened or closed.

That is, the center roller 20 is fixed to the vehicle body 3 when the door is opened or closed, but the center roller 20 may be moved relative to the center rail 10 as the center rail 10 moves.

The lower rail 30 may be curvedly mounted at a lower side of the vehicle body 3 so as to be directed toward the inside of the vehicle in the longitudinal direction of the vehicle body 3.

The lower roller 40 is mounted at the lower side inside the door at a corresponding position so as to be coupled to the lower rail 30, and a lower bearing unit 430 (see FIG. 7), which is formed at one side of the lower roller 40, is seated on the lower rail 30 when the door is opened or closed, such that the lower roller 40 may move along the lower rail 30.

Figure 2A:
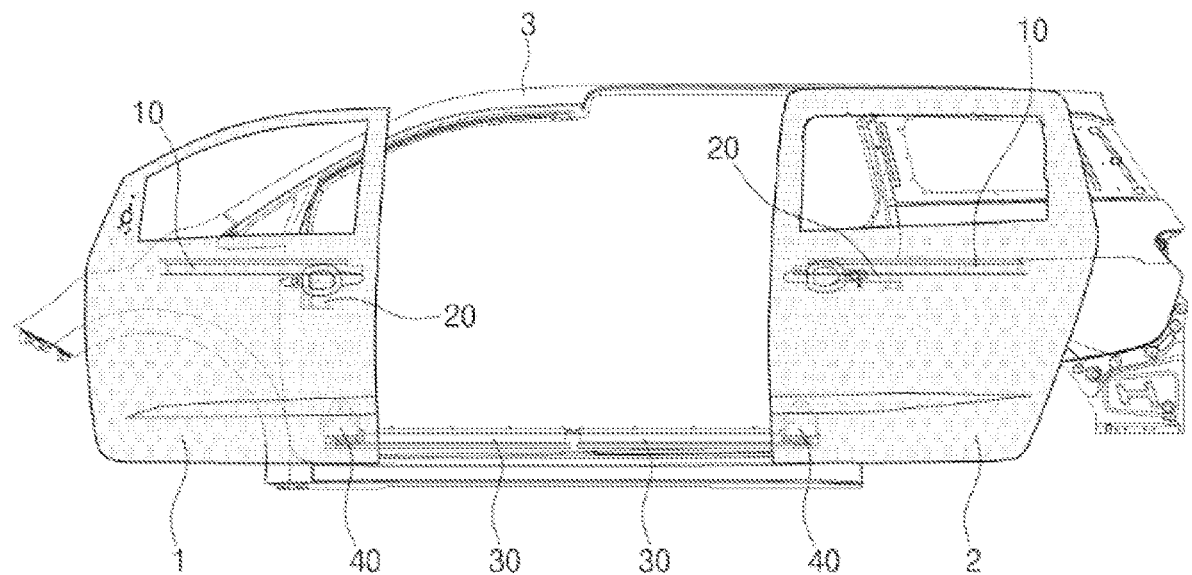
FIG. 2A is a front view of a vehicle body on which the device for operating opposite sliding doors according to the present invention is mounted in a state in which the doors are opened.
Figure 2B:
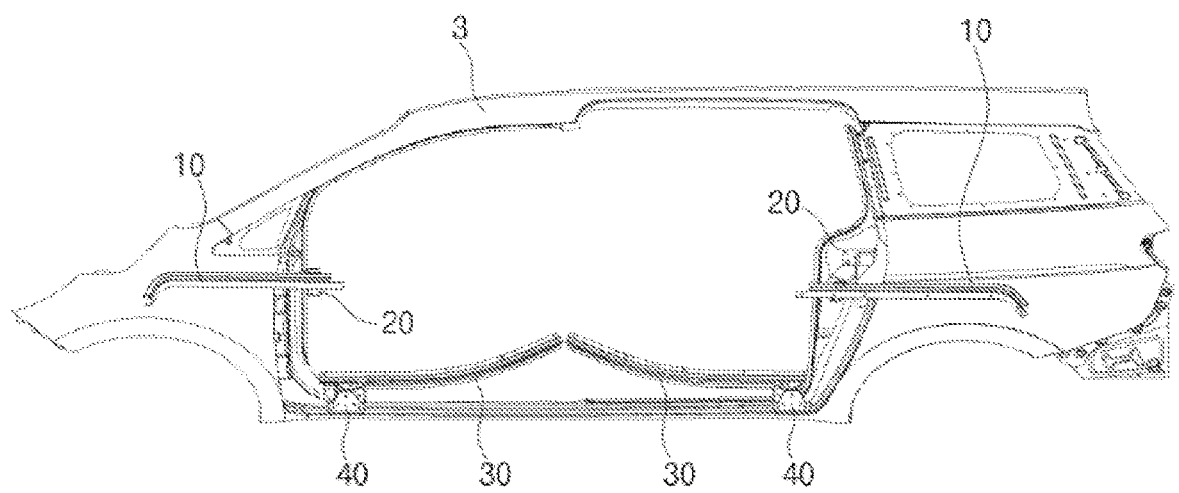
FIG. 2B is a front view illustrating a state in which the doors are removed from the vehicle body on which the device for operating opposite sliding doors according to the present invention is mounted when the doors are opened.

FIG. 2A illustrates a front view of the vehicle body 3 on which the device for operating opposite sliding doors according to the present invention is mounted in a state in which the doors are opened, and FIG. 2B illustrates a front view illustrating a state in which the doors are removed from the vehicle body 3 on which the device for operating opposite sliding doors according to the present invention is mounted when the doors are opened.

Referring to FIGS. 2A and 2B, when a user tries to open the doors by hand or the doors are automatically opened by a mechanical mechanism, the center rails 10 mounted on the doors perform a rolling movement by means of the center rollers 20, and the lower rollers 40 perform a rolling movement along the lower rails 30, such that the doors may be moved to the outside of the vehicle interior.

The center roller 20 has a center shaft 23 formed at a position spaced apart from the center bearing unit 250 so that the center roller 20 may rotate, and the lower roller 40 has a lower shaft 45 formed at a position spaced apart from the lower bearing unit 430 so that the lower roller 40 may rotate.

Therefore, when the doors are opened or closed, the center roller 20 and the lower roller 40 may rotate the doors toward the inside or outside of the vehicle interior of the vehicle body 3 and may simultaneously move the center roller 20 and the lower roller 40 along the curved center rail 10 and the curved lower rail 30, while rotating about the center shaft 23 and the lower shaft 45, respectively. This configuration will be described in detail below.

Figure 3:
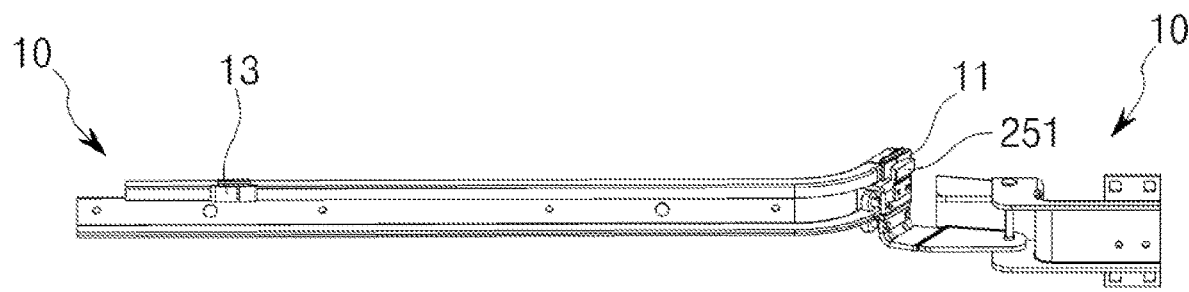
FIG. 3 is a perspective view of a center rail to which a center roller according to the present invention is coupled.

FIG. 3 illustrates a perspective view of the center rail 10 to which the center roller 20 according to the present invention is coupled.

Referring to FIG. 3, the center rail 10 may be curvedly mounted at the center inside the door in the longitudinal direction of the vehicle body 3 so that the door is directed toward the outside of the vehicle interior when the door is opened.

Therefore, when the user tries to open the door, the center rail 10 performs a rolling movement by means of the center roller 20, and simultaneously, the door may not only move leftward and rightward in the longitudinal direction of the vehicle body 3 along a curved line from a start point of the movement, but also move to the outside of the vehicle interior.

Figure 4:
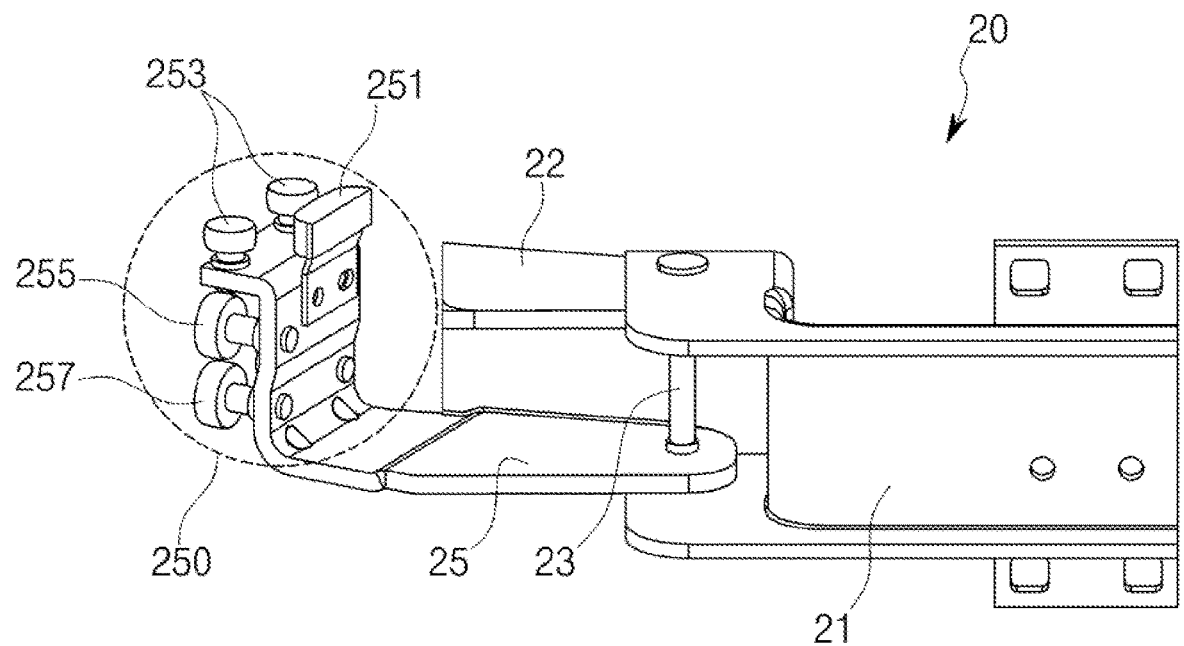
FIG. 4 is a perspective view of the center roller according to the present invention.

FIG. 4 illustrates a perspective view of the center roller 20 according to the present invention.

Referring to FIG. 4, the center roller 20 may include a center fixing unit 21, a center rotation unit 25, a center rotation restriction unit 22, and the center bearing unit 250.

One side of the center fixing unit 21 is mounted on the vehicle body 3 to fix the center roller 20 to the vehicle body 3, and the center fixing unit 21 is coupled in parallel with the vehicle body 3. The other side of the center fixing unit 21 may be bent at a predetermined angle so that the center fixing unit 21 may be connected to the center rotation unit 25 through the center shaft 23.

One end of the center rotation unit 25 is connected to the center fixing unit 21 so as to be pivotable about the center shaft 23, and the center bearing unit 250 coupled to the center rail 10 is mounted at the other end of the center rotation unit 25.

As the center roller 20 is fixed to the vehicle body 3, the center rotation unit 25 and the center fixing unit 21 are pivotably connected to correspond to the movement of the center rail 10 having a curved shape.

Since the center fixing unit 21 and the center rotation unit 25 are pivotably connected, the center roller 20 may rotate about the center shaft 23 and thus move relative to the curved center rail 10 when the door is opened, and simultaneously, the center roller 20 may rotate the door to the outside of the vehicle interior of the vehicle body 3.

When the door is closed, the center roller 20 may rotate about the center shaft 23 and thus move relative to the curved center rail 10, and simultaneously, the center roller 20 may rotate the door to the inside of the vehicle interior of the vehicle body 3.

The center rotation restriction unit 22 is connected to the center fixing unit 21 so as to be pivotable about the center shaft 23, and the center rotation restriction unit 22 may be mounted at a lateral side of the center rotation unit 25, thereby restricting a rotation angle of the center rotation unit 25 when the door is opened or closed.

The center bearing unit 250 may include center guide bearings 253, a center anti-rotation bearing 255, a center rod bearing 257, and a male stopper 251.

The center bearing unit 250 may be coupled to the center rail 10, thereby enabling the center rail 10 to perform the rolling movement by means of the center roller 20.

Figure 5A:
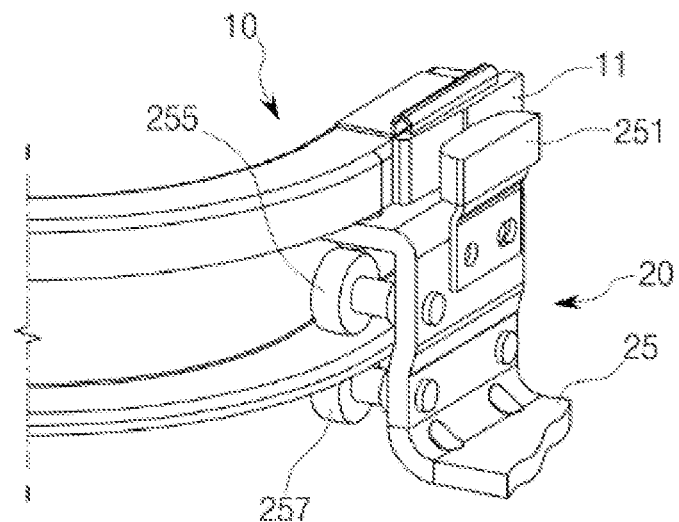
FIG. 5A is a perspective view of a center bearing unit coupled to the center rail according to the present invention.
Figure 5B:
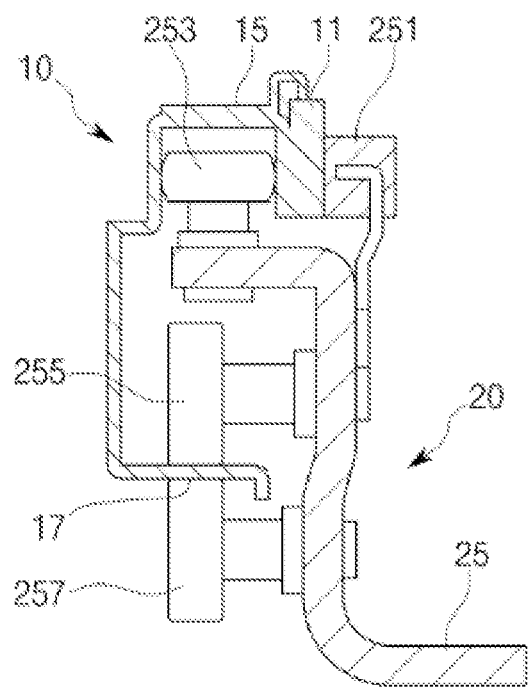
FIG. 5B is a cross-sectional side view of the center bearing unit coupled to the center rail according to the present invention.

FIG. 5A illustrates a perspective view of the center bearing unit 250 coupled to the center rail 10 according to the present invention, and FIG. 5B illustrates a cross-sectional side view of the center bearing unit 250 coupled to the center rail 10 according to the present invention.

Referring to FIGS. 5A and 5B, the center rail 10 may include a center guide portion 15 and a center support portion 17.

Referring to FIG. 5B, the center guide portion 15 may be formed by bending an upper portion of the center rail 10 in an n shape toward the center roller, and the center support portion 17 may be formed by bending a lower portion of the center rail 10 toward the center roller 20.

The center guide bearing 253 is formed in a cylindrical shape and inserted into a lower side of the center guide portion 15 so that a circumferential surface of the center guide bearing 253 comes into contact with lateral surfaces of the center guide portion 15. When the door is opened or closed, the circumferential surface of the center guide bearing 253 rotates along the lateral surfaces of the center guide portion 15, thereby enabling the center roller 20 to perform the rolling movement.

In this case, the center guide bearing 253 is formed such that both of the lateral surfaces of the center guide portion 15 are in contact with the circumferential surface of the center guide bearing 253, thereby preventing the center roller 20 from being withdrawn from the center rail 10 and guiding the door along a movement trajectory.

The center anti-rotation bearing 255 is formed in a cylindrical shape and inserted into an upper side of the center support portion 17 so that a circumferential surface of the center anti-rotation bearing 255 comes into contact with the center support portion 17. When the door is opened or closed, the center anti-rotation bearing 255 may rotate in the state in which the circumferential surface of the center anti-rotation bearing 255 is in contact with an upper surface of the center support portion 17.

Therefore, when the door is opened or closed, the center anti-rotation bearing 255 may serve to prevent the door from rotating without hindering the center roller 20 moving the center rail 10.

The center rod bearing 257 is formed in a cylindrical shape and inserted into a lower side of the center support portion 17 so that a circumferential surface of the center rod bearing 257 comes into contact with the center support portion 17. When the door is opened or closed, the center rod bearing 257 may rotate in the state in which the circumferential surface of the center rod bearing 257 in contact with a lower surface of the center support portion 17. Therefore, the center rod bearing 257 may support a load of the door.

The male stopper 251 having a protrusion shape is formed at an upper side of the center bearing unit 250. The male stopper 251 may prevent the center rail 10 from moving along the center roller 20 while exceeding a predetermined range.

Referring to FIG. 3, a full-opening female stopper 13, which is formed at a corresponding position so that the full-opening female stopper 13 comes into contact with the male stopper 251 when the door is opened, may be formed at one side of the center rail 10, and a closing female stopper 11, which is formed at a corresponding position so that the closing female stopper 11 comes into contact with the male stopper 251 when the door is closed, may be formed at the other side of the center rail 10. Therefore, the full-opening female stopper 13, the closing female stopper 11, and the male stopper may restrict a range in which the door is opened or closed.

The full-opening female stopper 13, together with the male stopper 251, may support the door in a state in which the door is in a fully opened state, thereby preventing the door from moving. Likewise, the closing female stopper 11, together with the male stopper 251, may support the door in a state in which the door is in a closed state, thereby preventing the door from moving.

Referring to FIG. 5B, the closing female stopper 11 and the male stopper 251 are in surface-to-surface contact with each other, but a fixing portion of the center guide bearing 253 and a fixing portion of the male stopper 251 may not be in contact with each other.

Therefore, in a case in which the closing female stopper 11, the full-opening female stopper 13, and the male stopper 251 are made of a material such as rubber, it is possible to prevent noise between the components and improve durability of the components.

Figure 6A:
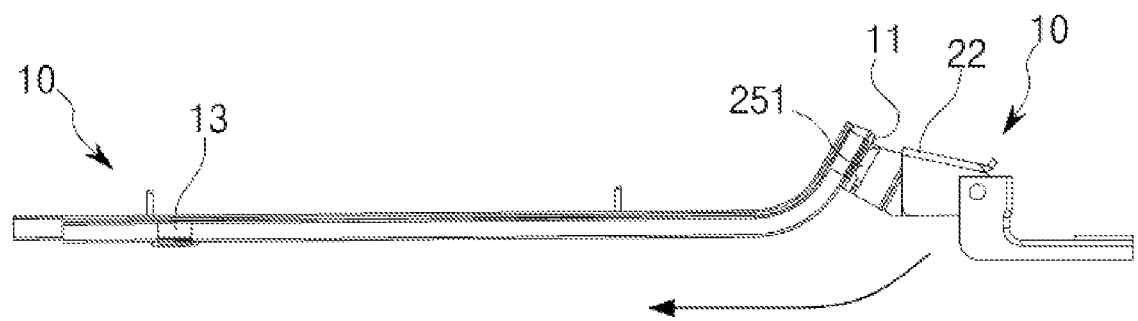
FIG. 6A is a top plan view of the center roller coupled to the center rail according to the present invention when the doors are closed.
Figure 6B:
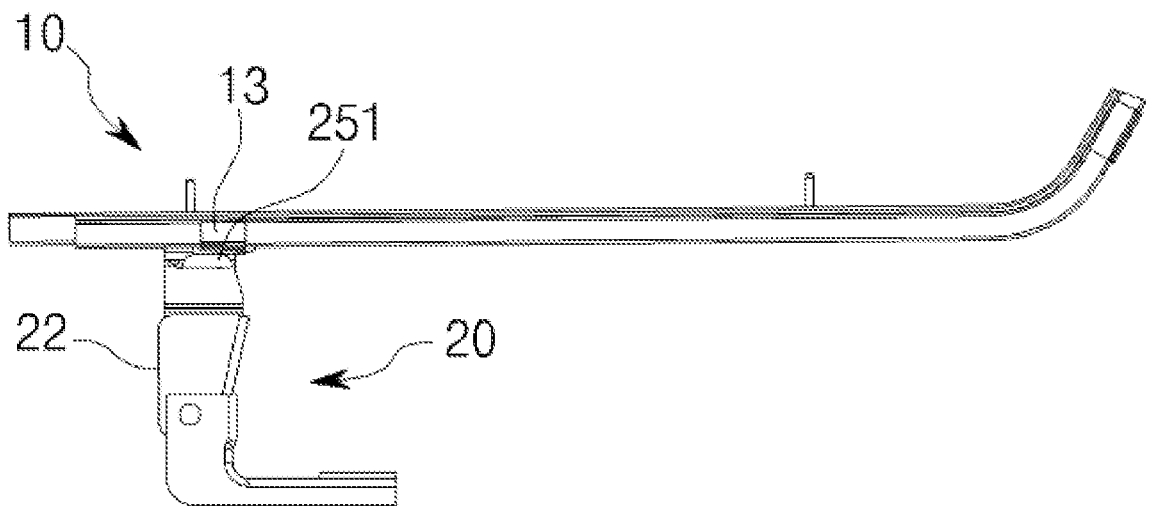
FIG. 6B is a top plan view of the center roller coupled to the center rail according to the present invention when the doors are opened.

FIG. 6A illustrates a top plan view of the center roller 20 coupled to the center rail 10 according to the present invention when the door is closed, and FIG. 6B illustrates a top plan view of the center roller 20 coupled to the center rail 10 according to the present invention when the door is opened.

Referring to FIGS. 6A and 6B, when the door is closed, the closing female stopper 11 may come into contact with the male stopper 251 to maintain the closed state of the door. When the center rail 10 moves in an arrow direction illustrated in FIG. 6A and the fully opened state is made as illustrated in FIG. 6B, the full-opening female stopper 13 may come into contact with the male stopper 251 to maintain the opened state of the door and prevent the door from further moving, thereby restricting a movement range of the door.

Referring to FIGS. 6A and 6B, the center rotation restriction unit 22 may be mounted at the lateral side of the center rotation unit 25 to restrict a predetermined angle so that the center rotation unit 25 may rotate within the predetermined angle when the door is fully opened or fully closed.

Figure 7:
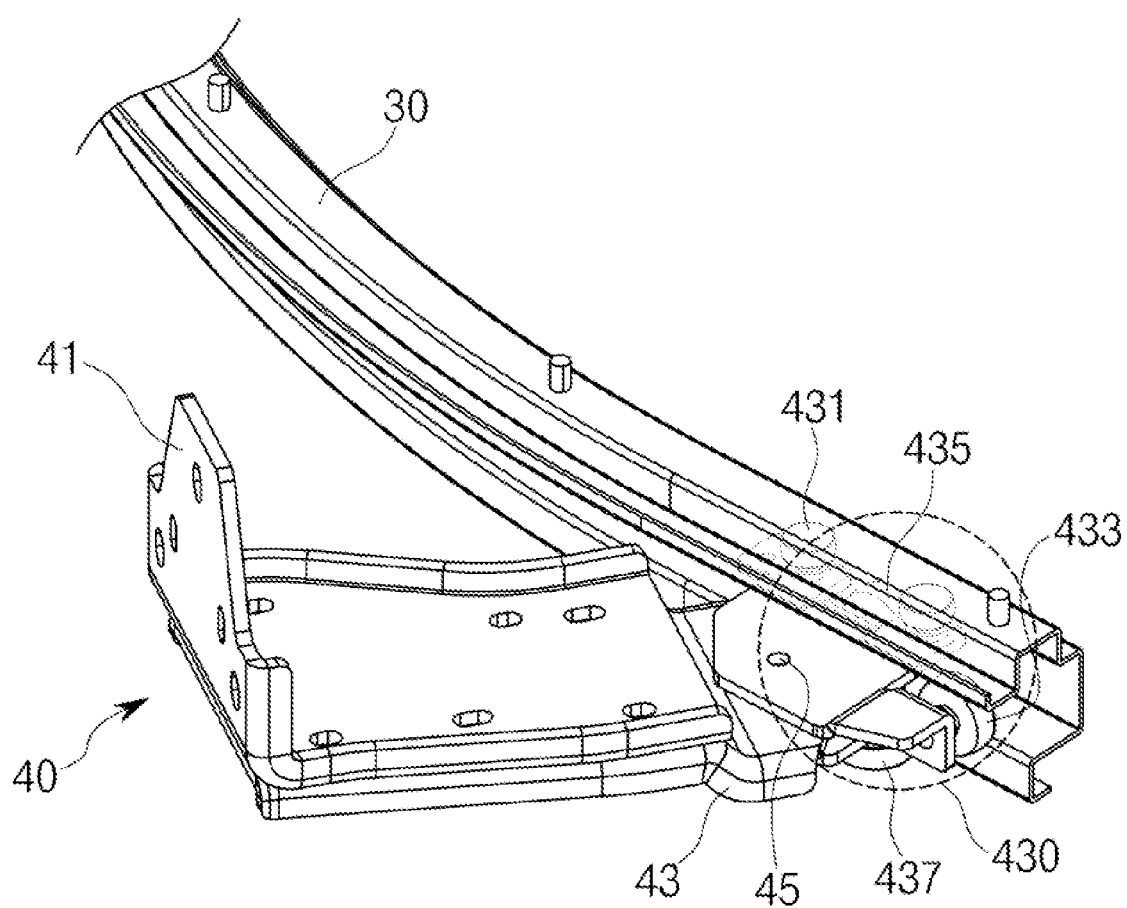
FIG. 7 is a perspective view of a lower roller coupled to a lower rail according to the present invention.

FIG. 7 illustrates a perspective view of the lower roller 40 coupled to the lower rail 30 according to the present invention.

Referring to FIG. 7, the lower roller 40 may include a lower fixing unit 41, a lower rotation unit 43, and the lower bearing unit 430.

One side of the lower fixing unit 41 is mounted on the door to fix the lower roller 40 to the door, and the other side of the lower fixing unit 41 is bent in a 'ㄴ' shape at a predetermined angle. The lower shaft 45 is formed so that the lower rotation unit 43 may be coupled about the lower shaft 45.

As described above, one end of the lower rotation unit 43 may be connected to the lower fixing unit 41 so as to be pivotable about the lower shaft 45, and the lower bearing unit 430 may be mounted at the other end of the lower rotation unit 43.

Since the lower rail 30 is curvedly fixed to the vehicle body 3, the lower rotation unit 43 is pivotably connected to the lower fixing unit 41 so that the lower roller 40 moves along the lower rail 30.

As a result, when the door is opened, the lower rotation unit 43 may rotate about the lower shaft 45 to enable the lower roller 40 to move along the curved lower rail 30 and simultaneously rotate the door to the outside of the vehicle interior of the vehicle body 3. When the door is closed, the lower rotation unit 43 may rotate about the lower shaft 45 to enable the lower roller 40 to move along the curved lower rail 30 and simultaneously rotate the door to the inside of the vehicle interior of the vehicle body 3.

The lower bearing unit 430 includes lower guide bearings 431, a lower rod bearing 433, and lower anti-rotation bearings. The lower bearing unit 430 is coupled to the lower rail 30, thereby enabling the lower roller 40 to perform the rolling movement along the lower rail 30.

Figure 8A:
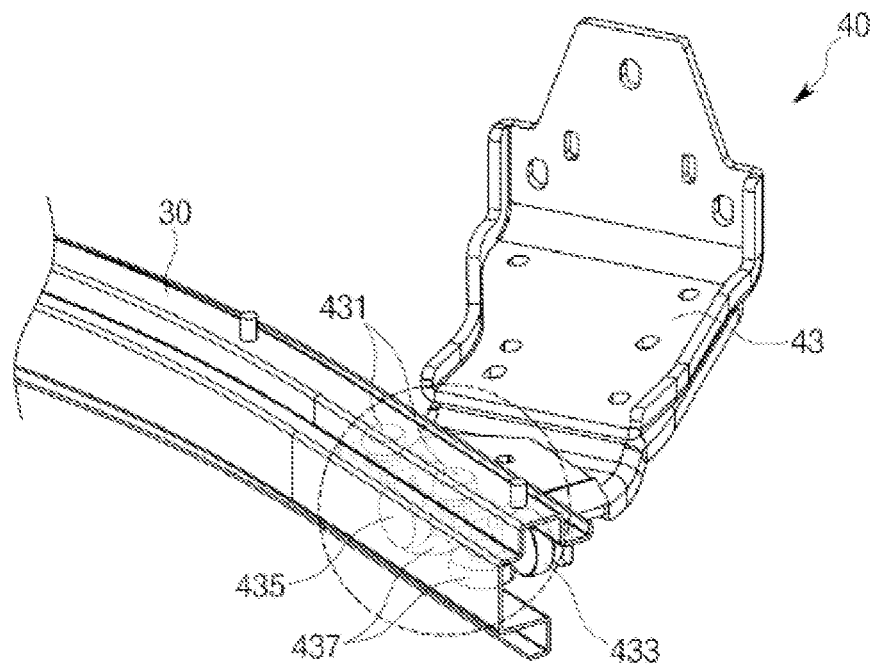
FIG. 8A is a perspective view of a lower bearing unit coupled to the lower rail according to the present invention.
Figure 8B:
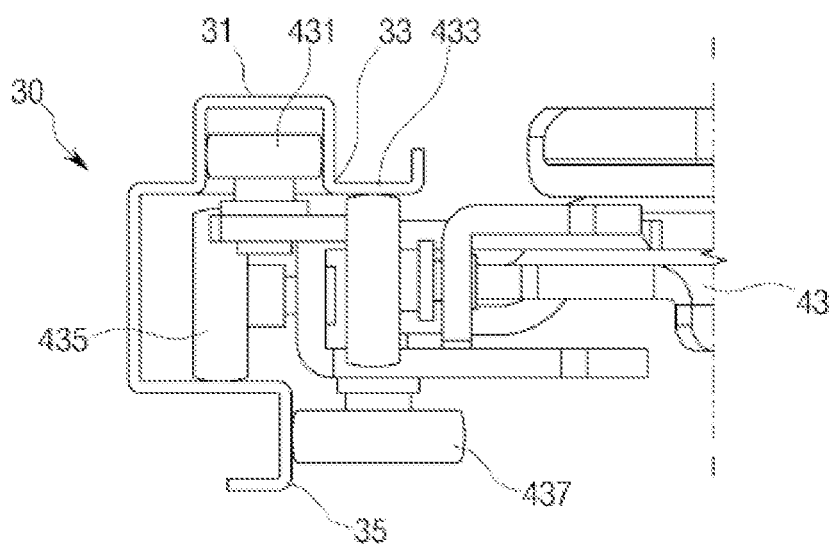
FIG. 8B is a side view of the lower bearing unit coupled to the lower rail according to the present invention.

FIG. 8A illustrates a perspective view of the lower bearing unit 430 coupled to the lower rail 30 according to the present invention, and FIG. 8B illustrates a side view of the lower bearing unit 430 coupled to the lower rail 30 according to the present invention.

Referring to FIG. 8B, the lower rail 30 may include a lower guide portion 31, a lower support portion 33, and a lower anti-rotation portion 35.

The lower guide portion 31 may be formed by bending an upper portion of the lower rail 30 in an n shape toward the lower roller 40, the lower support portion 33 may extend from the lower guide to the lower roller 40, and the lower anti-rotation portion 35 may be formed by bending a lower portion of the lower rail 30 toward the lower roller 40.

Referring to FIGS. 8A and 8B, the lower guide bearing 431 is formed in a cylindrical shape and inserted into a lower side of the lower guide portion 31 so that a circumferential surface of the lower guide bearing 431 comes into contact with lateral surfaces of the lower guide portion 31. The lower guide bearing 431 may perform the rolling movement along the lower rail 30 when the door is opened or closed.

The lower guide bearing 431 may prevent the lower roller 40 from being withdrawn from the lower rail 30 and guide the door along the movement trajectory.

The lower rod bearing 433 is formed in a cylindrical shape and inserted into a lower side of the lower support portion 33 so that a circumferential surface of the lower rod bearing 433 comes into contact with a lower surface of the lower support portion 33. When the door is opened or closed, the lower rod bearing 433 may support a load of the door while performing the rolling movement along the lower support portion 33.

The lower anti-rotation bearing is positioned such that the circumferential surface of the lower anti-rotation bearing comes into contact with the lower rail 30. When the door is opened or closed, the lower anti-rotation bearing may prevent the door from being rotated by a load of the door caused by the movement of the door along the lower rail 30.

The lower anti-rotation bearings may include a first lower anti-rotation bearing 435 which is positioned so that a circumferential surface of the first lower anti-rotation bearing 435 comes into contact with an upper surface of the lower anti-rotation portion 35, and a second lower anti-rotation bearing 437 which is positioned so that a circumferential surface of the second lower anti-rotation bearing 437 comes into contact with a lateral surface of the lower anti-rotation portion 35.

Similar to the center anti-rotation bearing 255, the first lower anti-rotation bearing 435 and the second lower anti-rotation bearing 437 may serve to prevent the door from rotating without hindering the movement of the lower roller 40 along the lower rail 30 when the door is opened or closed.

Figure 9A:
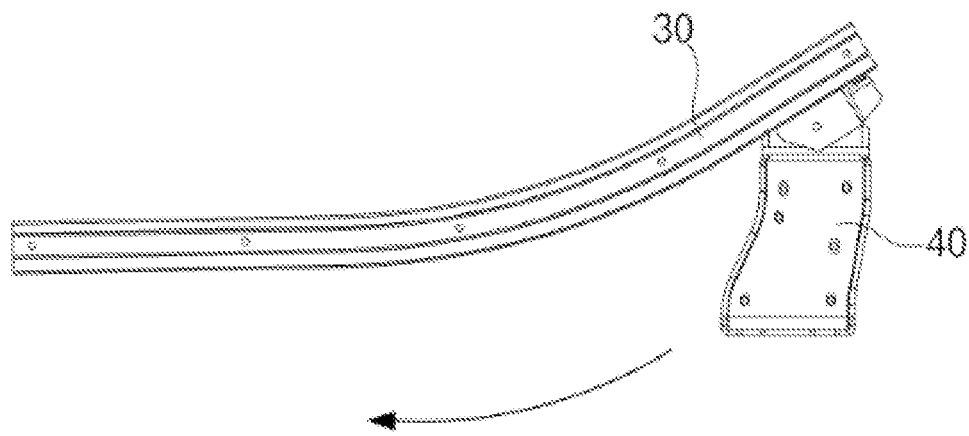
FIG. 9A is a top plan view of the lower rail according to the present invention when the doors are closed.
Figure 9B:
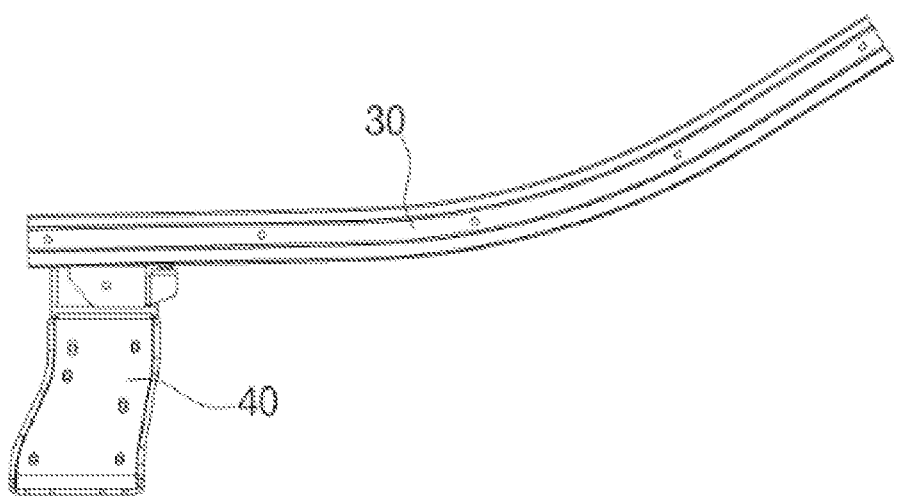
FIG. 9B is a top plan view of the lower rail according to the present invention when the doors are opened.

FIG. 9A illustrates a top plan view of the lower rail 30 according to the present invention when the door is closed, and FIG. 9B illustrates a top plan view of the lower rail 30 according to the present invention when the door is opened.

Referring to FIG. 9, the lower rail 30 may be curvedly mounted on the vehicle body 3 in the longitudinal direction of the vehicle body 3 so that the door is directed toward the inside of the vehicle when the door is closed.

Therefore, when the user tries to close the door, the lower roller 40 performs the rolling movement along the lower rail 30, and simultaneously, the door may not only move leftward and rightward in the longitudinal direction of the vehicle body 3 along a curved line from a start point of the movement, but also move to the inside of the vehicle interior.

As described above, when the door is opened after the door is completely closed, the lower roller 40 moves in an arrow direction illustrated in FIG. 9A. In this case, when the lower rotation unit 43 rotates about the lower shaft 45 along the curved lower rail 30, and thus the fully opened state is made as illustrated in FIG. 9B, an angle between the lower fixing unit 41 and the lower rotation unit 43 may vary.

Therefore, the door may not only move leftward and rightward in the longitudinal direction of the vehicle body 3, but also move to the outside of the vehicle interior.

An object and an effect of the present invention may be naturally understood or may become clearer from the following description, and the object and the effect of the present invention are not restricted only by the following description. In addition, in the description of the present invention, the specific descriptions of publicly known technologies related with the present invention will be omitted when it is determined that the specific descriptions may unnecessarily obscure the subject matter of the present invention.

What is claimed is:

1. A device for operating opposite sliding doors of a vehicle having a vehicle body, the device comprising:
    a center rail mounted at a center inside a first door in a longitudinal direction of the vehicle body, the center rail formed in a curved shape so that the first door moves to the outside of a vehicle interior of the vehicle when the first door is opened;
    a center roller mounted on the vehicle body so as to correspond to the center rail, the center roller configured to move the center rail by being coupled to the center rail when the first door is opened or closed as a center bearing unit formed at one side of the center roller is seated on the center rail, wherein the center roller has a center shaft formed at a position spaced apart from the center bearing unit such that the center shaft can rotate the center roller;
    a lower rail mounted at a lower side of the vehicle body in the longitudinal direction of the vehicle body, the lower rail formed in a curved shape so that the first door moves inside the vehicle when the first door is closed; and
    a lower roller mounted at a lower side inside the first door so as to correspond to the lower rail, the lower roller configured to move along the lower rail by being coupled to the lower rail when the first door is opened or closed as a lower bearing unit formed at one side of the lower roller is seated on the lower rail, wherein the lower roller has a lower shaft formed at a position spaced apart from the lower bearing unit such that the lower shaft can rotate the lower roller;
    wherein the center bearing unit has a male stopper that is formed in a protrusion shape at an upper side of the center bearing unit to prevent the center rail from moving while exceeding a predetermined range;
    wherein the center rail further comprises a full-opening female stopper that is formed at one side of the center rail so as to come into contact with the male stopper when the first door is opened and a closing female stopper that is formed at another side of the center rail so as to come into contact with the male stopper when the first door is closed, wherein the full-opening female stopper, the closing female stopper, and the male stopper restrict an opening and closing range of the first door; and
    wherein the full-opening female stopper, together with the male stopper, prevents movement of the first door by fixing the first door when the first door is in an opened state, and the closing female stopper, together with the male stopper, prevents the movement of the first door by fixing the first door when the first door is in a closed state.

2. The device of claim 1, wherein the doors include a front door and a rear door, and wherein a pair of center rails, a pair of center rollers, a pair of lower rails, and a pair of lower rollers are mounted vertically symmetrically, such that the front door and the rear door are opened in opposite directions.

3. The device of claim 1, wherein the center rail further comprises a center guide portion that is bent in an n shape toward the center roller and positioned at an upper side of the center rail.

4. The device of claim 3, wherein the center bearing unit further comprises a center guide bearing which is formed in a cylindrical shape and inserted into a lower side of the center guide portion so that a circumferential surface of the center guide bearing comes into contact with a lateral surface the center guide portion, such that the circumferential surface of the center guide bearing can rotate along the lateral surface of the center guide portion to allow the center roller to perform a rolling movement when the first door is opened or closed, and the center guide bearing prevents the center roller from being withdrawn from the center rail and can guide the first door along a movement trajectory.

5. The device of claim 1, wherein the center rail further comprises a center support portion that is formed by being a lower portion of the center rail toward the center roller.

6. The device of claim 5, wherein the center bearing unit further comprises a center anti-rotation bearing that is formed in a cylindrical shape and is inserted into an upper side of the center support portion so that a circumferential surface of the center anti-rotation bearing comes into contact with the center support portion, such that the center anti-rotation bearing can rotate in a state in which the circumferential surface of the center anti-rotation bearing is in contact with an upper surface of the center support portion when the first door is opened or closed, and the center anti-rotation bearing prevents a rotation of the first door caused by a load of the first door when the first door is opened or closed.

7. The device of claim 5, wherein the center bearing unit further comprises a center rod bearing that is formed in a cylindrical shape and is inserted into a lower side of the center support portion so that a circumferential surface of the center rod bearing comes into contact with the center support portion, such that the center rod bearing can rotate in a state in which the circumferential surface of the center rod bearing is in contact with a lower surface of the center support portion when the first door is opened or closed, and the center rod bearing supports a load of the first door.

8. A device for operating opposite sliding doors of a vehicle having a vehicle body, the device comprising:
   a center rail mounted at a center inside a first door in a longitudinal direction of the vehicle body, the center rail formed in a curved shape so that the first door moves to the outside of a vehicle interior of the vehicle when the first door is opened;
   a center roller mounted on the vehicle body so as to correspond to the center rail, the center roller configured to move the center rail by being coupled to the center rail when the first door is opened or closed as a center bearing unit formed at one side of the center roller is seated on the center rail, wherein the center roller has a center shaft formed at a position spaced apart from the center bearing unit such that the center shaft can rotate the center roller;
   a lower rail mounted at a lower side of the vehicle body in the longitudinal direction of the vehicle body, the lower rail formed in a curved shape so that the first door moves inside the vehicle when the first door is closed; and
   a lower roller mounted at a lower side inside the first door so as to correspond to the lower rail, the lower roller configured to move along the lower rail by being coupled to the lower rail when the first door is opened or closed as a lower bearing unit formed at one side of the lower roller is seated on the lower rail, wherein the lower roller has a lower shaft formed at a position spaced apart from the lower bearing unit such that the lower shaft can rotate the lower roller;
   wherein the center bearing unit has a male stopper that is formed in a protrusion shape at an upper side of the center bearing unit to prevent the center rail from moving while exceeding a predetermined range;
   wherein the center rail further comprises a full-opening female stopper that is formed at one side of the center rail so as to come into contact with the male stopper when the first door is opened and a closing female stopper that is formed at another side of the center rail so as to come into contact with the male stopper when the first door is closed, wherein the full-opening female stopper, the closing female stopper, and the male stopper restrict an opening and closing range of the first door;
   wherein the full-opening female stopper, together with the male stopper, prevents movement of the first door by fixing the first door when the first door is in an opened state, and the closing female stopper, together with the male stopper, prevents the movement of the first door by fixing the first door when the first door is in a closed state; and wherein the center roller further comprises a center fixing unit that has one side which is mounted on the vehicle body to fix the center roller to the vehicle body, and another side that is bent at a predetermined angle and at which the center shaft is formed, and a center rotation unit that has one end which is connected to the center fixing unit so as to be pivotable about the center shaft, and another end at which the center bearing unit is mounted.

9. The device of claim 8, wherein the center roller further comprises a center rotation restriction unit that is connected to the center fixing unit so as to be pivotable about the center shaft and mounted at a lateral side of the center rotation unit to restrict a rotation angle of the center rotation unit when the first door is opened or closed.

10. The device of claim 8, wherein the center roller can rotate about the center shaft and thus move relative to the curved center rail when the first door is opened, and simultaneously the center roller may rotate the first door to the outside of the vehicle interior of the vehicle body.

11. A device for operating opposite sliding doors of a vehicle having a vehicle body, the device comprising:
   a center rail mounted at a center inside a first door in a longitudinal direction of the vehicle body, the center rail formed in a curved shape so that the first door moves to the outside of a vehicle interior of the vehicle when the first door is opened;
   a center roller mounted on the vehicle body so as to correspond to the center rail, the center roller configured to move the center rail by being coupled to the center rail when the first door is opened or closed as a center bearing unit formed at one side of the center roller is seated on the center rail, wherein the center roller has a center shaft formed at a position spaced apart from the center bearing unit such that the center shaft can rotate the center roller;
   a lower rail mounted at a lower side of the vehicle body in the longitudinal direction of the vehicle body, the lower rail formed in a curved shape so that the first door moves inside the vehicle when the first door is closed; and
   a lower roller mounted at a lower side inside the first door so as to correspond to the lower rail, the lower roller configured to move along the lower rail by being coupled to the lower rail when the first door is opened or closed as a lower bearing unit formed at one side of the lower roller is seated on the lower rail, wherein the lower roller has a lower shaft formed at a position spaced apart from the lower bearing unit such that the lower shaft can rotate the lower roller;
   wherein the center bearing unit has a male stopper that is formed in a protrusion shape at an upper side of the center bearing unit to prevent the center rail from moving while exceeding a predetermined range;
   wherein the center rail further comprises a full-opening female stopper that is formed at one side of the center rail so as to come into contact with the male stopper when the first door is opened and a closing female stopper that is formed at another side of the center rail so as to come into contact with the male stopper when the first door is closed, wherein the full-opening female stopper, the closing female stopper, and the male stopper restrict an opening and closing range of the first door;
   wherein the full-opening female stopper, together with the male stopper, prevents movement of the first door by fixing the first door when the first door is in an opened state, and the closing female stopper, together with the male stopper, prevents the movement of the first door by fixing the first door when the first door is in a closed state; and wherein the lower rail further comprises a lower guide portion that is bent in an n shape toward the lower roller and is positioned at an upper side of the lower rail, and a lower support portion that extends from the lower guide portion to the lower roller.

12. The device of claim 11, wherein the lower bearing unit further comprises a lower guide bearing that is formed in a cylindrical shape and is inserted into a lower side of the lower guide portion so that a circumferential surface of the lower guide bearing comes into contact with a lateral surface of the lower guide portion, such that the lower guide bearing can perform a rolling movement along the lower rail when the first door is opened or closed, and the lower guide bearing prevents the lower roller from being withdrawn from the lower rail and guides the first door along a movement trajectory.

13. The device of claim 11, wherein the lower bearing unit further comprises a lower rod bearing that is formed in a cylindrical shape and is inserted into a lower side of the lower support portion so that a circumferential surface of the lower rod bearing comes into contact with a lower surface of the lower support portion, such that the lower rod bearing can perform a rolling movement along the lower support portion when the first door is opened or closed, and the lower rod bearing supports a load of the first door.

14. The device of claim 1, wherein the lower rail further comprises a lower anti-rotation portion that is formed by bending a lower portion of the lower rail toward the lower roller.

15. The device of claim 14, wherein the lower bearing unit further comprises a lower anti-rotation bearing that is positioned such that a circumferential surface of the lower anti-rotation bearing comes into contact with the lower anti-rotation portion and prevents a rotation of the first door caused by a load of the first door when the first door is opened or closed.

16. The device of claim 15, wherein the lower anti-rotation bearing comprises:
a first lower anti-rotation bearing that is positioned such that a circumferential surface of the first lower anti-rotation bearing comes into contact with an upper surface of the lower anti-rotation portion and can perform a rolling movement along the lower anti-rotation portion when the first door is opened or closed; and
a second lower anti-rotation bearing that is positioned such that a circumferential surface of the second lower anti-rotation bearing comes into contact with a lateral surface of the lower anti-rotation portion and can perform a rolling movement along the lower anti-rotation portion when the first door is opened or closed.

17. The device of claim 1, wherein the lower roller further comprises:
a lower fixing unit that has one side mounted on the first door to fix the lower roller to the first door, and another side that is bent at a predetermined angle and at which the lower shaft is formed; and
a lower rotation unit that has one end connected to the lower fixing unit so as to be pivotable about the lower shaft, and another end at which the lower bearing unit is mounted.

18. The device of claim 17, wherein when the first door is opened, the lower rotation unit is configured to rotate about the lower shaft to enable the lower roller to move along the curved lower rail and to simultaneously rotate the first door to the outside of the vehicle interior of the vehicle body, and when the first door is closed, the lower rotation unit is configured to rotate about the lower shaft to enable the lower roller to move along the curved lower rail and to simultaneously rotate the first door to the inside of the vehicle interior of the vehicle body.

19. The device of claim 8, wherein the doors include a front door and a rear door, and wherein a pair of center rails, a pair of center rollers, a pair of lower rails, and a pair of lower rollers are mounted vertically symmetrically, such that the front door and the rear door are opened in opposite directions.

20. The device of claim 11, wherein the doors include a front door and a rear door, and wherein a pair of center rails, a pair of center rollers, a pair of lower rails, and a pair of lower rollers are mounted vertically symmetrically, such that the front door and the rear door are opened in opposite directions.

* * * * *